United States Patent [19]
Tang et al.

[11] Patent Number: 6,068,705
[45] Date of Patent: May 30, 2000

[54] PROCESS FOR PRODUCING LOW DE STARCH HYDROLYSATES BY NANOFILTRATION FRACTIONATION, PRODUCTS OBTAINED THEREBY, AND USE OF SUCH PRODUCTS

[75] Inventors: Dan Tang, Quincy; Liuming Zhou, Hamilton; Robert Gerhardt, Sutter; Ibrahim Abou-Nemeh; Carl Jaundoo, both of Quincy; Tom Parady, Hamilton, all of Ill.

[73] Assignee: Roquette Freres, Lestrem, France

[21] Appl. No.: 09/221,902

[22] Filed: Dec. 28, 1998

Related U.S. Application Data

[63] Continuation-in-part of application No. 09/066,651, Apr. 27, 1998, Pat. No. 5,853,487.

[51] Int. Cl.$^7$ .................................................. C08B 31/00
[52] U.S. Cl. ......................... 127/32; 127/71; 106/215.5; 426/590; 426/661
[58] Field of Search .................... 127/32, 71; 106/215.5; 426/590, 661

[56] References Cited

U.S. PATENT DOCUMENTS

| | | |
|---|---|---|
| Re. 30,880 | 3/1982 | Armbruster . |
| 3,756,853 | 9/1973 | Meyer et al. . |
| 3,764,346 | 10/1973 | Noznick et al. . |
| 3,974,032 | 8/1976 | Harjes et al. . |
| 3,974,033 | 8/1976 | Harjes et al. . |
| 3,974,034 | 8/1976 | Horn et al. . |
| 4,298,400 | 11/1981 | Armbruster . |
| 4,689,235 | 8/1987 | Barnes et al. . |
| 4,840,807 | 6/1989 | Yoshida et al. . |
| 5,087,461 | 2/1992 | Levine et al. . |
| 5,124,162 | 6/1992 | Boskovic et al. . |
| 5,506,353 | 4/1996 | Subramaniam . |
| 5,612,202 | 3/1997 | Brumm . |
| 5,695,802 | 12/1997 | Van Den Ouweland et al. . |
| 5,780,090 | 7/1998 | Frerot et al. . |
| 5,786,017 | 7/1998 | Blake et al. . |

OTHER PUBLICATIONS

Kearsley, et al., "Reverse Osmosis of Glucose Syrups", *Die Starke 28*, (Jan. 1976,) Nr. 4, pp. 138–144.

(List continued on next page.)

*Primary Examiner*—David Brunsman
*Attorney, Agent, or Firm*—Henderson & Sturm LLP

[57] ABSTRACT

A process for producing a low DE starch hydrolysate, involves fractionating a starch hydrolysate comprising a DE greater than about 18 using a nanofiltration membrane, having a molecular weight cut-off of less than about 4,000 daltons, under nanofiltration conditions effective to result in a low DE starch hydrolysate comprising a DE of less than about 25. A process for producing a low DE starch hydrolysate blend involves combining the product produced by the process of the present invention with At least one other substance in a predetermined blending ratio to result in a low DE starch hydrolysate blend. A process for hydrogenating a low DE starch hydrolysate produced by the process of the present invention to result in an hydrogenated low DE starch hydrolysate. A process for producing a substantially thermal and shelf-life stable emulsion comprising forming a mixture of the low DE starch hydrolysate of the invention with an effective concentration of at least one ingredient to result in an emulsion. A process for producing a substantially dry ingredient encapsulate comprising the steps of:(1) forming an aqueous matrix composition comprising the low DE starch hydrolysate of the invention; (2) mixing at least one ingredient with said matrix composition to form a mixture; and (3) drying said mixture to result in a substantially dry ingredient encapsulate.

62 Claims, 1 Drawing Sheet

OTHER PUBLICATIONS

Birch, et al., "The Fractionation of Glucose Syrups by Reverse Osmosis", (Apr. 22–26, 1974) pp. 220–224.

R.D. Waniska, et al., "Comparison of Methods for Separating Oligosaccharides: Ultrafiltration . . .", *Journal of Food Science,* vol. 45 (1980) no month provided, pp. 1260–1284.

R.J. Peterson, et al., "Thin Film Composite Reverse Osmosis Membranes", *Handbook of Industrial Membrane Technology,* pp. 321–327, no date provided.

L. P. Raman, "Consider Nanofiltration for Membrane Separations", *Chemical Engineering Progress,* (Mar. 1994), pp. 68–74.

H.R. Sloan, et al., "Large Scale Production of Glucose Oligomers and Polymers for Physiological Studies in Humans", *Preparative Biochemistry,* 1954(4), (1985), pp. 259–279.

I. Abou–Nemeh and A.P. Van–Peteghem "Some Aspects of Emulsion Instability Using Sorbitan Monoolete (Span 80) as a Surfactant in Liquid Emulsion Membranes" Chem. Ing. Tech. 62(5) 420–3, (1990), no month provided.

I. Abou–nemeh and A.P. Van–Peteghem "Membrane Aging and Related Phenomena in liquid Surfactant Membranes Process" Sep. Sci. Technol. 29(6), 727–41 (1994) no month provided.

PROCESS FOR PRODUCING LOW DE STARCH HYDROLYSATES BY NANOFILTRATION FRACTIONATION, PRODUCTS OBTAINED THEREBY, AND USE OF SUCH PRODUCTS

CROSS-REFERENCE TO RELATED APPLICATIONS

This application is a Continuation-In-Part Application of U.S. Ser. No. 09/066,651, filed Apr. 27, 1998, entitled "Process for Producing Low Starch Hydrolysates By Nanofiltration Fractionation and Blending of Resultant Products, Preferably in Liquid Form, With Other Carbohydrates," now U.S. Pat. No. 5,853,487, the disclosure of which is hereby incorporated by reference in its entirety.

AUTHORIZATION PURSUANT TO 37 C.F.R. §1.71 (d) (e)

A portion of the disclosure of this patent document, including appendices, may contain material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

1. Field of the Invention

The present invention is directed to producing low DE starch hydrolysates, which involves fractionating a starch hydrolysate having a DE greater than about 18 using a nanofiltration membrane under nanofiltration conditions effective to result in low DE starch hydrolysate having a DE of less than about 25; resultant low DE starch hydrolysate products; blends of such low DE starch hydrolysates with other substances; and emulsions and encapsulates prepared using such low DE starch hydrolysates.

2. Description of the Related Art

Maltodextrins, a low DE starch hydrolysate with a dextrose equivalent (DE) of not more than about 20, e.g., 4 to 20, have bland taste, low sweetness, and low hygroscopicity. Such products are useful as bases for the preparation of food items as well as for bodying agents and as additives having non-sweet, water-holding, non-hygroscopic characteristics. Other applications include their use as a carrier for synthetic sweeteners, as spray drying adjunct, as bulking, bodying or dispersing agents, as moisture holding agents, and as energy source in sports drinks.

Most commercially available maltodextrins in the world market produced by known technology are in the solid form or crystalline form due to retrogradation or haze formation or microbial instability in liquid form. However, there is a demand for a maltodextrin in its liquid form which exhibits extreme clarity, low viscosity, and will not develop retrogradation upon storage at room temperature.

There have been low DE liquid maltodextrins produced using conventional processes, such as enzyme conversion, chromatographic fractionation and membrane fractionation. However, the products produced suffered disadvantages including instability in liquid form or high viscosity.

U.S. Pat. No. 3,974,032 is directed to a haze resistant low DE liquid starch hydrolysate which has its weight average molecular weight to its number average molecular weight ratio less than about 20, and has less than about 20% by weight, dry basis, of starch oligosaccharides having a degree of polymerization greater than about 200 (DP200+). The low DE starch hydrolysate was prepared by enzymatically hydrolyzing starch dextrins having a degree of branching of at least about 7.

U.S. Pat. Nos. 3,974,033 and 3,974,034 disclose methods to produce a low DE maltodextrin and improve stability by enzymatic hydrolysis of oxidized starch. The maltodextrin is characterized as being haze-free for long period of time at high solids concentration. The maltodextrin is prepared by first liquefying a highly oxidized starch with acid or enzyme to a DE not substantially above about 7; and, in a subsequent step, converting the oxidized and liquefied starch with a bacterial alpha-amylase enzyme preparation to achieve a maltodextrin product having a DE not substantially above about 20.

U.S. Pat. No. 4,298,400 discloses another enzyme hydrolysis method to produce non-haze low DE liquid starch hydrolysates. The product, prepared by two step hydrolysis both using bacterial alpha amylase, has a descriptive ratio higher than 2.0, and, therefore, exhibits non-haze property.

U.S. Pat. No. Re. 30,880 discloses a similar product and a similar process except that the first step hydrolysis was accomplished by acid instead of enzyme hydrolysate.

U.S. Pat. No. 4,840,807 discloses a fractionation method to produce liquid low DE branched maltodextrins. The process comprises the steps of reacting alpha-amylase with starch to produce a starch hydrolysate in the DE range of 10 to 35, and then contacting the resulting saccharified solution with a gel-type filter agent, thereby selectively fractionating the branched dextrin and linear oligo-saccharides. The gel-type filtering agent is an ion exchange resin and the fractionation system is a simulated moving bed. The resulted branched oligosaccharides has a mean molecular weight of from about 800 and to about 16,000 with a corresponding DE from about 20 to about 1.

Membrane separation is known to fractionate polysaccharides of sugars. Waniska et al. (Journal of Food Science, Vol. 45 (1980), 1259) discloses the fractionating ability of three ultra filtration (UF) membranes compared with gel permeation and chromatography for separating oligosaccharides (DP5-20) from lower molecular sugar. Birch et al. (Die Starke 26. Jahrg. 1974/Nr. 7, 220) discloses the fractionation of glucose syrups by reverse osmosis (RO) which offers a means for the manufacture of several new types of syrup, and which enables entire groups of sugars to be eliminated under selected conditions. Products in the range 43–80 DE or 15–43 DE can be obtained using suitable combinations of different membranes. Kearsley et al. (Die Starke 28. Jahrg. 1976/Nr. 4, 138) discloses the reverse osmosis(RO) of glucose syrups and ultra filtration (UF) operations to isolate specific groups of sugars, high or low molecular weight or both, from the syrup. Sloan et al. (Preparative Biochemistry, 15(4), 1985, 259–279) discloses the molecular filtration of ultra filtration (UF) membranes to concentrate oligosaccharides with degrees of polymerization above 10 from corn starch hydrolysate. It is not believed that any of these processes has been used to make a non-retrograded maltodextrin having low viscosity.

U.S. Pat. No. 3,756,853 (1973) discloses a reverse osmosis (RO) membrane process for making non-hazing low DE starch hydrolysate. The product was produced by concentrating a feed corn syrup of 20 to 40 DE through a cellulose acetate reverse osmosis (RO) membrane until the DE of the retentate has been reduced to between about 5 to about 18.

Those concerned with low DE starch hydrolysates recognize the need for an improved low DE starch hydrolysate, particularly in liquid form, and more particularly, in blends thereof with other substances.

Substantial research has been directed to the problem of inherent instability of emulsions or multiphase systems, defined as thermodynamically metastable or unstable systems. Emulsion stability is a complicated phenomenon and a function of many variables, for example, viscosity, temperature, size distribution of internal phase droplets, stirring speed and time, surfactant type and concentration, phase ratio and composition, conductivity, and dielectric constant (P. Sherman "Emulsion Science", Academic press, N.Y, 2nd. Ed. (1988); I. Abou-Nemeh and A. P. Van-Peteghem "Some Aspects of Emulsion Instability Using Sorbitan Monooleate (Span 80) as a Surfactant in Liquid Emulsion Membranes" Chem.-Ing, Tech. 62(5), 420–3, (1990); I. Abou-Nemeh and A. P. Van-Peteghem "Membrane Aging and Related Phenomena in liquid Surfactant Membranes Process", Sep.Sci.Technol. 29 (6), 727–41, (1994)).

For example, in the case of O/W emulsions, of particular use in encapsulation, there is a continuous breakdown of emulsion, where the internal phase droplets (i.e. oil) collide with each other to form bigger ones. If this process continues unabatedly, it will result in coalescence of the dispersed phase droplets, and consequently, this will lead to phase separation.

Accordingly, those concerned with the art of emulsions recognize the need for improved emulsion compositions exhibiting long-term stability of emulsions comprising, for example, flavors, oils, fragrances, dyes, insecticides, biologically active drugs, etc.

Further it is well known and scientifically documented in the art of encapsulation of volatiles, oils, fragrances, etc., that for the latter to be fixed and encapsulated in a glassy-type substrate, it is recommended to have a certain composition which contains a specific material, i.e. high molecular weight oligosaccharides, maltodextrins, starch, etc., which will enhance the film forming properties of the mixture and boost its encapsulative ability for spray-drying or extrusion purposes (U.S. Pat. Nos. 4,689,235; 5,124,162; 5,087,461; 5,786,017; 5,506,353; 5,780,090; 5,695,802; 3,764,346). However, encapsulation with conventional starch hydrolysates suffers from a variety of problems, including: high viscosity of the low DE starch hydrolysate substrate, low loading capacity, poor stability of the encapsulate, and formation of colored byproducts.

Accordingly, those concerned with the art of encapsulation recognize the need for improved encapsulation compositions that are stable, exhibit improved loading capacity and retention of, for example, flavors, oils, fragrances, dyes, insecticides, drugs, fine and benign chemicals, etc., and which may be antioxidant-free and be manufactured using substrates at relatively low dry solids content with superior film forming capability and encapsulative ability.

BRIEF SUMMARY OF THE INVENTION

The present invention is directed to a process for producing a low DE starch hydrolysate, which involves fractionating a starch hydrolysate having a DE greater than about 18 using a nanofiltration membrane, preferably selected from the group consisting of teflon membranes, stainless steel membranes, ceramic membranes, and polymeric membranes; and/or having a molecular weight cut-off of less than about 4,000 daltons, under nanofiltration conditions effective to result in low DE starch hydrolysate having a DE of less than about 25.

In accordance with the present invention, the nanofiltration membranes are more preferably selected from the group consisting of polyamide membranes and polysulfonated polysufone membranes wherein such preferred membranes preferably have a molecular weight cut-off within a range of about 400 to about 4,000 daltons, more preferably within a range of about 800 daltons to about 2500, and most preferably about 1,000 daltons.

In accordance with the present invention, such nanofiltration membranes preferably comprise a thin film composite membrane, wherein the preferred thin film composite membrane is selected from the group consisting of polyamide membranes and polysulfonated polysulfone membranes.

For purposes of the present invention, specific examples of nanofiltration membranes may be selected from the group consisting of ASP40 and ASP50 (manufactured by Advanced Membrane Technology), and GH and GE, (manufactured by Osmonics/Desal).

For purposes of the present invention, effective nanofiltration conditions comprise a pressure less than about 600 pounds per square inch, preferably wherein the pressure is within the range of about 100 psi to about 500 psi; and a temperature less than about 95° C., preferably wherein the temperature is within the range of about 40° C. to about 80° C.

In one embodiment of the present invention, the low DE starch hydrolysate comprises a liquid, low DE starch hydrolysate having a DE of less than about 25 and a polydispersity index of less than about 5. The liquid, low DE starch hydrolysate preferably comprises a dry solids content within a range of about 50% to about 85%, and/or a viscosity at 70% dry solids content and at 25° C. of less than about 30,000 centipoise. The liquid low DE starch hydrolysate preferably is substantially non-retrograding and microbial stable.

The present invention is also directed to a process for producing a low DE starch hydrolysate-blend, which involves combining the product of the present invention, generally described above and in more detail hereinbelow, with at least one other substance in a predetermined blending ratio to result in a low DE starch hydrolysate-blend, preferably wherein the substance comprises a carbohydrate, and more preferably wherein the substance is a carbohydrate selected from the group consisting of sugar alcohols, propylene glycol, glycerine, and saccharides.

The present invention also involves hydrogenating, and/or derivatizing, and/or drying the low DE starch hydrolysate of the present invention to result in an hydrogenated, and/or derivatized, and/or dry low DE starch hydrolysate.

It is accordingly an objective of the present invention to provide a nanofiltration membrane process for producing low DE starch hydrolysates having a DE less than about 25 and a polydispersity index of less than about 5, particularly in their liquid form which are eventually substantially retrogradation free, and have lower viscosity at high dry solids compared to conventional products.

It is also an objective of the present invention to produce low DE starch hydrolysate-blend products which are eventually substantially retrogradation free, and have very low viscosity.

The liquid form and its characteristics of low viscosity are particularly suitable for drying, preferably by spray drying or extrusion, the liquid to result in a solid or substantially dry product.

The present invention is also directed to a process for producing a substantially thermal and shelf-life emulsion comprising forming a mixture of the low DE starch hydrolysate of the present invention, in its non-hydrogenated or hydrogenated form, with an effective concentration of at least one ingredient to result in an emulsion characterized by thermal and shelf-life stability. Preferably, the emulsion exhibits a viscosity suitable for spray-drying or extrusion.

In one embodiment of the present invention, the low DE starch hydrolysate comprises a dry solids content within a range of about 1% to about 75% weight concentration and the effective concentration of the ingredient is within a range of about 0.1% to about 50% weight concentration.

It is yet another objective of the present invention to provide a process for producing a substantially dry ingredient encapsulate comprising the step of forming an aqueous matrix composition comprising the low DE starch hydrolysate of the present invention, in its non-hydrogenated, or hydrogenated, or derivatized form; mixing at least one ingredient with said matrix composition to form a mixture; and drying said mixture to result in a substantially dry ingredient encapsulate.

In accordance with the present invention the content of the ingredient is more preferably within a range of about 0.1% to about 75% by weight and the low DE starch hydrolysate comprises a dry solid content within a range of about 25% to about 55% by weight.

DETAILED DESCRIPTION OF THE INVENTION

Figure 1:
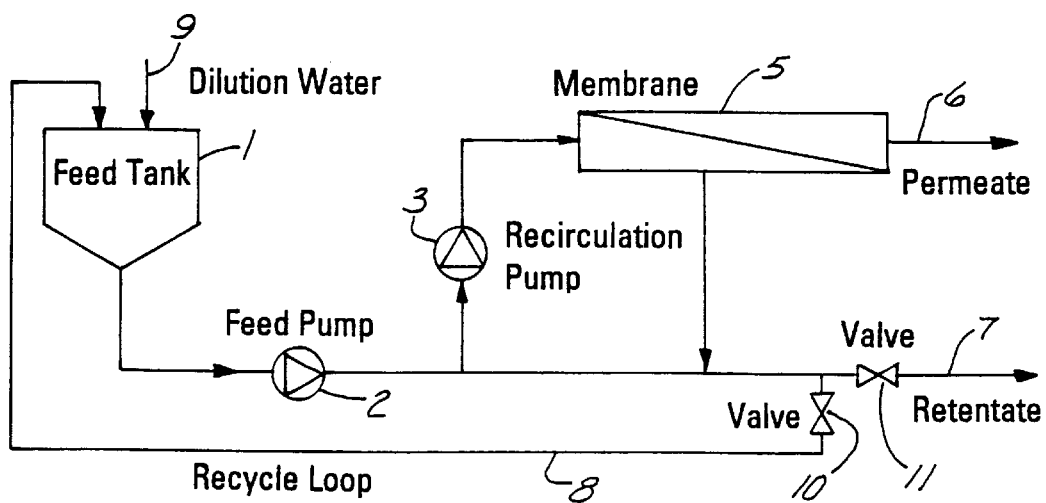
FIG. 1 shows a flow diagram for a nanofiltration process in accordance with the present invention.

The following is a detailed description of the present invention intended to be claimed:

The low DE starch hydrolysates of the present invention are produced by a nanomembrane filtration process shown in FIG. 1.

In general, the process for producing a low DE starch hydrolysate in accordance with the present invention involves fractionating a starch hydrolysate having a DE greater than about 18, and in particular greater than about 21, using a nanofiltration membrane, preferably selected from the group consisting of teflon membranes, stainless steel membranes, ceramic membranes, and polymeric membranes membranes, and/or having a molecular weight cut-off of less than about 4,000 daltons, under nanofiltration conditions effective to result in low DE starch hydrolysate having a DE of less than about 25.

The starch hydrolysate having a DE greater than about 18 suitable for purposes of the present invention are starch hydrolysates having a DE greater than about 18, and in particular greater than about 21, and which may be in non-hydrogenated, hydrogenated, oxidized or other derivatized form, which are effective in resulting in a low DE starch hydrolysate having a DE of less than about 25 upon fractionation in accordance with the present invention.

In accordance with the present invention, the polymeric nanofiltration membranes are preferably selected from the group consisting of polyamide membranes and polysulfonated polysufone membranes.

For purposes of the present invention, the nanofiltration membranes are more preferably selected from the group consisting of polyamide membranes and polysulfonated polysulfone membranes having a molecular weight cut-off within a range of about 400 to about 4,000 daltons, more preferably within a range of about 800 daltons to about 2500, and most preferably of about 1,000 daltons. Such nanofiltration membranes preferably comprise a thin film composite membrane, wherein a preferred thin film composite membrane is selected from the group consisting of polyamide membranes and polysulfonated polysulfone membranes. Specific examples of nanofiltration membranes include membranes selected from the group consisting of ASP40 and ASP50 (manufactured by Advanced Membrane Technology); and GH and GE, (manufactured by Osmonics/Desal). The thin film composite membranes may comprise polysulfone as support and polyester as backing. The membrane configuration may be selected from the group consisting of flat sheets, tubes, and spiral wound membranes.

The flux of permeate, defined as gallons per square foot per day, in nanofiltration processes in accordance with the present invention varies with pressure. The higher the pressure, the higher the flux. In accordance with the process of the present invention, the nanofiltration step of the present invention is operated at a pressure preferably of less than about 600 psi, and most preferably within a range of about 100 psi and about 500 psi. In contrast, conventional reverse osmosis processes typically require 500 to 2500 psi operating pressure in order to obtain meaningful flux. In accordance with the present invention, for a permeate flux of a starting material feed of corn syrup having a DE 36 and a 30% dry solids at 50° C. and a pressure of about 480 psi is not less than 12 gallon per square foot per day (GFD).

The permeate flux in nanofiltration processes also varies with different temperature. An increase of the operating temperature of about 10° C. can increase the flux by as much as 100%. However, as the operating temperature is increased, there is an increase in the tendency of certain membranes (e.g., polymeric) to rupture. As a result, the nanofiltration step of the processes of the present invention is operated at as high a temperature as possible to obtain maximum permeate flux without damaging membrane materials and structure or degrading the product. Accordingly, the operating temperature of the nanofiltration processes of the present invention is preferably less than about 95° C., more preferably within the range of about 40° C. to about 80° C., and most preferably at about 45° C. to about 65° C.

Accordingly, a low DE starch hydrolysate is fractionated using such a nanofiltration membrane under nanofiltration conditions which comprise a pressure less than about 600 pounds per square inch, preferably wherein the pressure is less than about 500 psi; and a temperature less than about 95° C., preferably wherein the temperature is less than about 80° C.

The nanofiltration step of the present invention can be operated as a batch operation or continuous operation. A batch operation can be operated using a closed single nanofiltration membrane element or a plurality of nanofiltration membrane elements in parallel or series, wherein a given starch hydrolysate as starting material feed is fractionated through a suitable nanofiltration membrane at a pressure and a temperature within previously described pressure ranges and temperature ranges, respectively, with retentate being recycled back to the feed tank to reduce the DE of the material in the feed tank and thus obtain a low DE starch hydrolysate having the desired DE value. In continuous operation, the starch hydrolysate as a starting material feed can be pumped through a series of membrane elements in serial or serial-parallel set-up for fractionation to reduce the DE of the starch hydrolysate and obtain a low DE starch hydrolysate having the desired DE value.

In one embodiment, the process of the present invention comprises refining the starch hydrolysate having a DE greater than about 18. Then, said starch hydrolysate is refined prior to fractionation using nanofiltration membrane. The refining step takes place before membrane separation.

In another embodiment, the process of the present invention comprises refining the low DE starch hydrolysate. The refining step takes place after membrane separation. Obviously, it is possible to have refining steps both before and after the membrane separation step.

For purposes of the present invention, refining comprises more preferably a conventional carbon treatment and a conventional ion exchange treatment of the material to be refined to de-color and de-ash the material.

Referring to FIG. 1, at the beginning of the process, starting material, i.e., corn syrup at about 30% dry substance, is transferred into the feed tank (1). The corn syrup starting material preferably has a DE greater than about 18 DE. The starting material as a feed is pumped through a feed pump (2) to a membrane element. A recirculation pump (3) is used to increase cross flow velocity of the liquid. The feed material is subjected to membrane fractionation by permeation of small molecular weight materials such as oligosaccharides lower than DP5 through a nanofiltration membrane which retains large molecular weight materials. Permeate (6) from the membrane (5) is taken out of the system. The retentate (7) from the membranes (5) is recycled (8) back to the feed tank (1) until the DE of the retentate (7) reaches target, preferably lower than 20 DE. Since retentate (7) is recycled (8) to the feed tank (1) during batch processing, the dry substance increases. Therefore, dilution water (9) needs to be added in order to maintain high flux of membrane fractionation. In continuous processing, valve (10) is always closed, and there is no recycle fluid back to the tank.

In one embodiment of the present invention, the low DE starch hydrolysate which is produced comprises a liquid, low DE starch hydrolysate having a DE of less than about 25. The liquid, low DE starch hydrolysate preferably comprises a dry solids content within a range of about 50% to about 85%. The liquid, low DE starch hydrolysate preferably has a viscosity at 70% dry solids content and at 25° C. of less than about 30,000 centipoise (cp), measured using a Brookfield viscometer. For purposes of the present invention, the viscosity at 70% dry solids by weight and at 25° C. is more preferably between about 4,000 cp and 20,000 cp.

The low DE starch hydrolysates produced in accordance with the present invention have lower viscosity than conventionally acid or enzyme converted material having substantially the same DE. For the same DE product, viscosity increases with a higher concentration of long chain molecules (e.g., oligosaccharides of DP21+). Although not wishing to be bound by any particular theory, the lower viscosity property of products produced in accordance with the present invention is attributed to their lower weight concentration of DP21+ which is only about 11% at about 14 DE. This is in contrast to conventionally converted 14 DE maltodextrin which has at least about 40% DP21+. In general, a nanofiltration membrane produced maltodextrin of 18 DE and 70% dry substance at 25° C. has a viscosity of less than about 8,000 centipoise. While the conventionally enzyme converted maltodextrin of the same DE, same dry substance and at the same temperature has a viscosity of about 20,000 centipoise (cp). The low viscosity of the low DE starch hydrolysates and maltodextrins produced in accordance with the present invention allows such products to be concentrated or evaporated up to about 80% dry solids content, or higher, without any handling difficulty.

A high content of dry substance, e.g., equal or above about 75%, results in an additional advantage of the low DE starch hydrolysates of the present invention which is microbial stability. Water activity of low DE starch hydrolysates and maltodextrins produced in accordance with the present invention at a dry solids content of about 75% weight concentration is lower than about 0.86 at room temperature, which is stable enough for shipping in liquid form.

The low DE starch hydrolysate product of the present invention preferably has a DE of less than about 25, a polydispersity index of less than about 5, less than about 10% weight concentration of mono- and di- saccharides, and less than about 40% weight concentration of oligosaccharides with degree of polymerization higher than about 21. Preferably the low DE starch hydrolysate product comprises liquid, low DE starch hydrolysate having a moisture content within a range of about 50% to about 85% and/or a viscosity at 70% dry solids content and at 25° C. of less than about 30,000 cp, preferably wherein the viscosity is within the range of about 2,000 cp to about 25,000 cp, and more preferably about 4,000 cp to about 20,000 cp.

In accordance with the present invention preferred low DE starch hydrolysate products have a DE within a range of about 4 up to about 20; the concentration of mono- and di-saccharides is less than about 10% by weight; and the concentration of oligosaccharides having a degree of polymerization higher than about 21 is less than about 35%, and preferably less than about 30% by weight.

Low DE starch hydrolysates produced in accordance with the present invention exhibit liquid solution stability, low viscosity, and may remain substantially retrogradation free over extended periods of time, even at high dry solids content, at refrigeration and room temperatures. The low DE starch hydrolysates and maltodextrins of the present invention normally have a DE not substantially above 25 for low DE starch hydrolysates and not substantially above 20 for maltodextrins. The low DE starch hydrolysates and maltodextrins of the present invention preferably have a DE within the range of 4 to 20. A typical maltodextrin produced in accordance with the present invention generally has a DE within the range of about 8 to about 18.

As used herein, low DE starch hydrolysate means a starch hydrolysate having a DE of not greater than about 25. Maltodextrin is a starch hydrolysate having a DE of not greater than about 20.

The term "dextrose equivalent" (DE), referred to herein, is defined as the reducing value of the maltodextrin or starch hydrolysate, material compared to the reducing value of an equal weight of dextrose, expressed as percent, dry basis, as measured by the School method described in Encyclopedia of Industrial Chemical Analysis, Vol. 11, pp. 41–42.

The term "polydispersity index", also referred to as "polymolecularity index", is defined as the ratio Mw/Mn, wherein Mw is the weight-average molecular weight and Mn is the number-average molecular weight. This ratio enables the overall dispersity of the molecular weights of a polymeric mixture to be characterized. In practice, the values of Mw and Mn may be determined by gel permeation chromatography, which is a technique well known by those skilled in the art.

The terms "non-retrograding", "retrogradation free", and the like are intended to be synonymous with "non-hazing" which is defined as having less than about 0.3 absorbency, and preferably less than about 0.1 absorbency, measured spectrophotometrically at about 600 nm, after storage at room temperature, i.e., about 23° C., for about three (3) months.

As used herein, the terms "stable", "stability", and the like refer to microbial stability and/or physical stability.

Although the present invention is disclosed using corn starch hydrolysates, also referred to as "corn syrup", derived from standard amylose-content corn as starting materials, glucose syrups and other starch hydrolysates from various cereal (e.g. wheat), tuber (e.g. potato), or other (e.g. chicory) starch sources and types (e.g. waxy) may be used.

The low DE starch hydrolysates of the present invention have a narrow saccharide distribution. In general, the polydispersity index is less than about 5 and the amount of monosaccharides and disaccharides is less than about 10% by weight and the amount of oligosaccharides of polymerization higher than about 21 is less than about 40% by weight, preferably less than about 35% by weight, and more preferably less than about 30% by weight.

The present invention is also directed to a process for producing a low DE starch hydrolysate-blend. In a preferred embodiment of the present invention, the low DE starch hydrolysate used in producing the blend comprises liquid, low DE starch hydrolysate which is substantially non-retrograding. In accordance with this embodiment of the present invention, the process comprises combining the low DE starch hydrolysate product of the present invention as described herein with at least one other substance in a predetermined blending ratio to result in a low DE starch hydrolysate-blend. For purposes of this embodiment of the present invention, the other substance is preferably a carbohydrate selected from the group consisting of sugar alcohols like sorbitol, mannitol, xylitol, maltitol, erythritol, isomalt, and hydrogenated starch hydrolysates (e.g. maltitol syrups), propylene glycol, glycerine, and saccharrides like insulin, glucose syrup, maltose syrup, and fructose syrup, lactose, erythrose, xylose and isomaltose. Preferably the low DE starch hydrolysate-blend produced in accordance with this embodiment of the present invention is substantially non-retrograding and comprises at least 50% weight concentration of low DE starch hydrolysate and no more than about 50% weight concentration of a member selected from the group consisting of sugar alcohols, propylene glycol, glycerine, insulin, glucose syrup, maltose syrup, and fructose corn syrup.

The low DE starch hydrolysates and maltodextrins produced by the nanofiltration membrane fractionation process of the present invention can be mixed, blended or otherwise combined with such substances to obtain a blended product having a lower viscosity and water activity than a blended product using conventional maltodextrins of substantially the same DE.

The fructose syrup preferred for purposes of this embodiment of the present invention is a high fructose syrup selected from the group consisting of 42 HFCS (i.e. glucose syrup containing about 42% fructose by weight) and 55 HFCS, with 55 HFCS being most preferred. The blending ratio of low DE starch hydrolysates, such as maltodextrin, in accordance with the present invention, with HFCS is from about 100:0 to about 50:50, wherein about 75:25 is most preferred. The resultant blend is particularly suitable for use in beverage and sports drinks.

In accordance with the present invention blending low DE starch hydrolystates and maltodextrins produced in accordance with the present invention can be accomplished by suitable means such as mixing, e.g., maltodextrin which has been evaporated to a dry substance content of about 70% by weight, with finished HFCS product having a dry substance content of about 70% by weight in a mixing tank. Blending can also be accomplished by continuous online mixing or other suitable means as are conventionally used for such purpose.

The process of the present invention also involves drying the liquid, low DE starch hydrolysate to result in a substantially dry product. Preferably the resulting low DE starch hydrolysate has a moisture content of less than about 10% by weight.

Drying means which may be used for purposes of dehydrating the liquid low DE starch hydrolysate in accordance with the present invention include conventional dehydration apparatus and methods suitable for dehydrating liquids having characteristics, such as viscosities, similar to those of the low DE starch hydrolysates. Preferably the drying comprises spray drying or extrusion.

The present invention is also directed to a process for producing a low DE starch hydrolysate-blend wherein the low DE starch hydrolysate comprises a substantially dry, low DE starch hydrolysate. In this embodiment, the low DE starch hydrolysate is combined preferably with a member selected from the group consisting of sugar alcohols, propylene glycol, glycerine, and saccharides.

The process of the present invention also involves hydrogenating the low DE starch hydrolysate having a DE of less than about 25 to result in a hydrogenated low DE starch hydrolysate, preferably wherein the hydrogenated low DE starch hydrolysate comprises liquid hydrogenated low DE starch hydrolysate or wherein the hydrogenated low DE starch hydrolysate comprises substantially dry hydrogenated low DE starch hydrolysate.

The present invention is also directed to a process for co-hydrogenation of a low DE starch hydrolysate-blend. In this embodiment, the process of the present invention comprises blending a low DE starch hydrolysate produced by nanofiltration in accordance with at least one other substance, preferably a carbohydrate as defined hereabove, to form a low DE starch hydrolysate-blend; and hydrogenating the low DE starch hydrolysate-blend to result in an hydrogenated low DE starch hydrolysate-blend.

To obtain the corresponding hydrogenated products, i.e., hydrogenated low DE starch hydrolysates and blends described above, they may be subjected to conventional hydrogenation. For example, the low DE starch hydrolysate resulting from nanofiltration fractionation may be subjected to the Raney nickel method of hydrogenation under suitable conditions therefor.

Thus, in accordance with the present invention, low DE starch hydrolysate and maltodextrin products may be liquid or substantially dry, hydrogenated or non-hydrogenated, substantially non-retrograding or retrograding, and blended with a carbohydrate or other substances or not. The hydrogenated form of the low DE starch hydrolysate and maltodextrin, may be obtained by conventional hydrogenation of the low DE starch hydrolysate, through hydrogenation of the starch hydrolysate starting material, or by co-hydrogenation of a blend comprising low DE starch hydrolysate and other substances, which may be carbohydrates.

Referring now to FIG. 1, in accordance with the process of the present invention, a conventionally converted corn starch hydrolysate, also referred to herein as "syrup" and "corn syrup", with a DE greater than about 18 DE, and preferably greater than about 21 DE, and in particular within a range of about 28 DE to 50 DE, is fed into a nanofiltration membrane, as shown in FIG. 1, for fractionation. The permeate from the membrane is taken out of the system, and the retentate is recycled to the feed tank for further concentration. Once the DE value of retentate reaches a target level, which is less than about 25 DE, preferably within a range of about 8 to about 20 DE, valve (11) in FIG. 1 is opened and valve (10) is closed. The retentate is sent forward into a storage tank as product. Operating pressures and temperatures are important process parameters. For purposes of the present invention, the operating pressure of the system is controlled to below about 600 psi, and preferably below about 500 psi. For purposes of the present invention, the operating temperature of the system is controlled to below about 95° C., and more preferably below about 80° C. For purposes of the present invention, a pH between about 2 to about 10 is preferred; and a pH between about 3 to about 8 is more preferred.

More specifically, in the process of the present invention, an acid converted starting material, such as corn starch hydrolysates (syrup) with a DE within a range of about 25 DE to about 63 DE, but preferably within a preferred range of about 25 DE to about 42 DE, is pumped through a nanofiltration membrane for fractionation at a transmembrane pressure less than 500 psi, permeate is removed from of the system and retentate is recycled to the feed until the DE of the syrup has been reduced to a desired level which is less than about 25 DE, and preferably within a range of about 8 to about 20.

For purposes of the present invention, the DE of the starch hydrolysate starting material is not less than about 18 DE, preferably not less than about 21 DE, more preferably within a range of about 25 to about 63 DE, and most preferably is within the range of about 25 to about 42 DE.

For purposes of the present invention, the preferred starch hydrolysate comprises a member selected from the group consisting of corn starch hydrolysate, wheat starch hydrolysate, root starch hydrolysate, and waxy maize starch hydrolysate, and the like most preferably wherein the starch hydrolysate comprises corn syrup. The raw material used may be its corresponding modified or unmodified form, although starches from any starch source may be used.

For purposes of the present invention, the starch hydrolysate comprising a DE of not less than about 18 DE is made by a conversion procedure selected from the group consisting of one-step conversion and multi-step conversion, preferably wherein the conversion procedure is selected from the group consisting of acid conversion, enzyme conversion, and mixed-conversion of both acid and enzyme, and most preferably comprises acid conversion and enzyme-enzyme conversion.

The low DE starch hydrolysates and maltodextrins of the present invention, whether in the form of syrups or dry powder, are particularly suitable for use in food and beverage products. The maltodextrins are especially useful in stable, low DE syrups.

The characteristics of the low DE starch hydrolysates and maltodextrins produced in accordance with the present invention make the products of the invention particularly suitable for applications as carriers for coloring agents, flavors, fragrances and essences, and synthetic sweeteners; spray drying adjuncts for coffee extracts and tea extracts; bulking, bodying and dispersing agents in synthetic creams or coffee whiteners; ingredients promoting a moisture retention in bread, pastry and meats; components of dry soup mixes, bakery mixes, frosting mixes, spice mixes and blends, coverage powders, condiments, gravy mixes, sauce mixes and frozen dairy foods; and in fat mimetics. In addition, they are useful in the formulation of tabulating compounds which can be used in food products or pharmaceutical products, anti-caking agents, whipped products, protective coatings, agglomeration aids, low or reduced-in-calorie foods and beverages. Further, the low DE starch hydrolysates and maltodextrins of the present invention are particularly suitable for use with beverage ingredients, food ingredients, animal feed ingredients, pharmaceutical ingredients, nutraceutical ingredients, cosmetic ingredients and industrial ingredients.

The present invention is also directed to a process for producing a substantially thermal and shelf-life stable emulsion. In a preferred embodiment of the present invention, the low DE starch hydrolysate used in producing the emulsion comprises liquid, low DE starch hydrolysate. In accordance with this embodiment, the process comprises combining the low DE starch hydrolysate product of the present invention, in its hydrogenated or non-hydrogenated form, as described herein with an effective concentration of at least one other ingredient to result in a stable emulsion.

For purpose of the present invention, the ingredient preferably comprises at least one member selected from the group consisting of organoleptics (e.g., flavors or fragances), agricultural chemicals (e.g., insecticides, fertilizers), flavor enhancers (e.g., acetaldehyde, citral), high intensity sweeteners (e.g., aspartame, acesulfame potassium), and active pharmaceutical substances (e.g., growth hormones, maturation inhibitors). The ingredient may be in pure form, in combination with other substances, with or without carriers.

The proportion of ingredient, and in particular flavoring agent, to be incorporated in the emulsion may be varied depending on the strength desired in the final product. Generally the effective concentration of ingredient is within a range of about 0.1% to about 50% by weight.

In accordance with the present invention, blending of low DE starch hydrolysate of the present invention and ingredient can be accomplished by suitable means as mixing, e.g., low DE starch hydrolysate evaporated to a dry substance content within a range of about 1% to about 75%, with an ingredient in a mixing tank. Other ingredients may be present in the emulsion of the present invention. These include emulsifiers, viscosity control agents, e.g., C2–C4 alkylene glycols such as ethylene glycol, propylene glycol, butylene glycol, etc., in effective quantities, generally below 15% weight. In one embodiment of the present invention, the emulsion further comprises an emulsifying amount of an emulsifier. For purpose of the present invention, the emulsifier is for example selected from the group consisting of non-ionic surfactants (e.g. sorbitan esters), lecithin, ionic surfactants (e.g. sodium dodecyl sulfate), and amphoteric surfactants (e.g. n-alkylbetaines).

According to the invention, the substantially thermal and shelf-life stable emulsion comprises the low DE starch hydrolysate of the invention as an aqueous matrix and at least one other ingredient. In a prefered embodiment, the content of said ingredient is preferably less than about 65% by weight. The emulsion of the present invention may be an oil in water emulsion or an water in oil emulsion, said emulsion comprising an emulsifier in said aqueous matrix. In particular, said emulsion may be an oil in water emulsion comprising the ingredient as an internal oil phase and the low DE starch hydrolysate of the invention as an external aqueous matrix.

The emulsions produced in accordance with the present invention exhibit improved emulsion stability compared to emulsions produced using conventional low DE starch hydrolysates or maltodextrins.

Furthermore, the present invention is also directed to a process for producing a substantially dry ingredient encapsulate comprising mixing the hydrogenated or non-hydrogenated liquid low DE starch hydrolysate of the present invention with an effective concentration of at least one ingredient to form a mixture, and drying said mixture.

More specifically, the process according to the present invention involves a first step comprising forming an aqueous matrix composition comprising low DE starch hydrolysate of the present invention, in its hydrogenated or non-hydrogenated form. Such composition is useful as a matrix to encapsulate and entrap the ingredient hereabove defined in an amorphous, glassy structure, and is superior in its performance compared to powder maltodextrins or analogous formulations used in the encapsulation industry. In a preferred embodiment, the low DE starch hydrolysate comprises a dry solids content within a range of about 25% to about 55% by weight.

The second step of the process according to the present invention comprises mixing at least one other ingredient with said matrix composition to form a mixture. In a preferred embodiment, said ingredient is within a range of about 0.1% to about 75% by weight, and preferably within a range of about 0.1% to about 50% by weight. Said mixture may comprise an emulsion and may contain an emulsifier depending on the nature of the ingredient. Mixing can be accomplished by suitable means as are conventionally used for such purpose.

The process of the present invention also involves drying said mixture to result in a substantially dry ingredient encapsulate. Said drying preferably comprises spray drying or extrusion. Thus, the resultant substantially dry ingredient encapsulate comprises at least one ingredient entrapped in an amorphous matrix of the low DE starch hydrolysate of the present invention.

EXAMPLES

The present invention will now be described in further detail by means of the following representative examples.

Example 1

An acid converted corn syrup having a DE of about 42 and dry solids content of about 23.7% by weight was pumped through a nanofiltration membrane for fractionation using a single pass nanofiltration process. The retentate was recycled to the feed tank until the DE has been reduced to DE 14.5. A thin film composite nanofiltration membrane, ASP 40, made by Advanced Membrane Technology, Inc., San Diego, Calif., is used for test runs. ASP 40 membrane has the following characteristics:

Membrane material: Thin film composite of sulfonated polysulfone on polysulfone, with a non-woven polyester backing Configuration: Spiral wound
Surface area: about 5.3 m² (4 inch diameter and 40 inch length)
Operating pressure: Up to about 600 psi
Operating temperature: Up to about 60° C.
Operating pH range: about 2–11
Maximum chlorine: about 200 ppm
Rejection specification: NaCl=30–40%, Lactose=45–65%

Preparation of the 42 DE starch hydrolysate starting material was accomplished by conventional acid conversion methods. The conversion process was terminated when the DE value of converted corn starch material reached about 42. The resultant 42 DE, acid converted corn starch material was clarified using a centrifuge to remove residual oil and protein. Following this, a carbon treatment and ion exchange refining process were conducted to de-color and de-ash the material. Finally, the material was evaporated to a dry substance content of about 70% by weight.

Fifteen gallons of acid converted corn syrup having a DE 42 was fed into the feed tank, e.g., as shown in FIG. 1, and diluted to a dry substance content of about 23.7% by weight. The processing line was a single stage system having one nanofiltration membrane element having a 4 inch diameter. The fractionation process was conducted as a batch operation. The permeate was removed from the system, and the retentate was recycled back to the feed tank. The DE value was monitored periodically. Dilution water was periodically added into the feed tank to maintain material dry substance content below about 50% by weight. Retentate recycle was terminated when the DE value of the retentate reached about DE 15. The retentate was then sent forward and collected in a storage container as product. The collected product had collected volume of 13 gallons, and a dry substance content of about 50.5% by weight.

The processing line was operated at a pressure of about 475 psi and a temperature of about 50° C. The permeate flux was 20.3 GFD at the beginning and 1.5 GFD at the end of fractionating. The resultant maltodextrin is substantially free of retrogradation, has a DE of 14.5 and the following carbohydrate profile:

| Component | Weight % D.S. basis |
| --- | --- |
| Fructose | 0.048 |
| Dextrose | 0.760 |
| DP2 | 1.517 |
| DP3 | 3.557 |
| DP4 | 6.627 |
| DP5 | 8.359 |
| DP6 | 8.442 |
| DP7 | 7.960 |
| DP8 | 7.375 |
| DP9 | 6.759 |
| DP10 | 5.835 |
| DP11–21 | 32.226 |
| DP21+ | 10.534 |

The above-described maltodextrin was further evaporated using a lab rotary vacuum evaporator to obtain low DE starch hydrolysate having different dry solids content. The resultant low DE starch hydrolysate products were evaluated in a designed experiment wherein the variables and their ranges were: dry solids content within the range of about 65% to 75% by weight; storage temperature within the range of about 7° C. to about 49° C.; sorbic acid content within the range of about 0% to about 0.15% by weight; pH within a range of about 2.8 to about 3.5. Color, haze (represented by absorbency at 600 nm) direct count of bacteria, yeasts, and molds were tested at the beginning and after each month of the storage. After 4 months of storage, all 28 tested samples are still clear and retrogradation free.

The polydispersity index of the resultant maltodextrin is 1.59. The viscosity of the resultant maltodextrin in accordance with the present invention is 65,500 cp at 75.3% dry solids and 7450 cp at 70% dry solids, which is lower than conventionally converted maltodextrin as listed in Table 3 in example 7.

Example 2

In this example, a 36 DE acid converted corn syrup was used as starting material. This starting material was produced by the same process as in Example 1 except that the conversion terminated when the DE value of the acid converted corn syrup material reached about DE 36 and the converted material was not fully ion exchange refined.

The same processing system and nanofiltration membrane as in Example 1 were used to produce the sample in this example. Thirty gallons of 36 DE corn syrup at a dry substance content of about 80% by weight was fed into the feed tank, e.g., as shown in FIG. 1, and diluted to a dry substance content of about 32.6% by weight. The fractionation process was conducted as a batch operation. The permeate was taken out of the processing system, and retentate was recycled back to the feed tank. The DE value was monitored periodically. Dilution water was periodically added into the feed tank to maintain material dry substance content below about 50% by weight. Retentate recycle was terminated when the DE value of the retentate reached about DE 18. The retentate was then sent forward and collected in a storage container as product. The collected product had a collected total volume of about 23 gallons and a dry substance content of about 51.3% by weight.

The operating conditions included a pressure of about 480 psi and a temperature of about 50° C. The permeate flux was 8.2 GFD at the beginning and 1.5 FGD at the end of fractionating. The resultant maltodextrin has a DE of 17.2 and the following carbohydrate profile:

| Component | Weight % D.S. basis |
| --- | --- |
| Fructose | 0.147 |
| Dextrose | 1.996 |
| DP2 | 3.038 |
| DP3 | 5.803 |
| DP4 | 6.884 |
| DP5 | 9.032 |
| DP6 | 10.626 |
| DP7 | 7.789 |
| DP8 | 5.272 |
| DP9 | 4.218 |
| DP10 | 4.059 |
| DP11–21 | 31.794 |
| DP21+ | 9.342 |

The collected maltodextrin product was further evaporated using a laboratory rotary vacuum evaporator to a dry solids content of 70.2% and 75.5% by weight.

Samples of the maltodextrin product at each of these dry solids contents were stored at room temperature for 2 months and analyzed. Both remained clear and retrogradation free.

The polydispersity index of the resultant maltodextrin is 2.45. The viscosity of the resultant maltodextrin in accordance with the present invention is 6930 cp at 70% dry solids by weight and at 25° C.

Example 3

An acid converted corn syrup having a D.E. of about 42 and dry solids of 43.5% is pumped through a nanofiltration membrane for fractionation using a single pass nanofiltration pilot plant as shown in the figure. The retentate is recycled to the feed tank until the DE has been reduced to 14.9. The pilot plant used for producing sample products is made by Niro, Inc., Hudson, Wis. A thin film composite polyamide membrane, GH, is used for the test runs and made by Desalination System, Inc., Vista, Calif. GH membrane has the following characteristics:
Membrane material: Thin film composite polyamide
Configuration: Spiral wound
Surface area: About 5.3 m² (4 inch diameter and 40 inch length)
Operating pressure: Up to 600 psi
Operating temperature: Up to 5° C.
Operating pH range: 2–11
Maximum chlorine: 20–50 ppm day
Rejection specification: 50% MgSO4 at 150 psi, and 25 degree C.

The acid converted 42 DE corn syrup feed material in this example was from corn starch. Corn starch having a dry substance content within the range of about 34 to 40% by weight was hydrolyzed using hydrochloric acid at a pH 1.8 and at a temperature of about 128° C. The conversion process was terminated when the DE value of converted corn syrup material reached about 42. The resultant 42 DE, acid converted corn syrup material was clarified using a centrifuge to remove residual oil and protein. Following this, a carbon treatment and ion exchange refining processes were conducted to de-color and de-ash the material. Finally, the material was evaporated to a dry substance content of about 80% by weight.

10 gallons of acid converted corn syrup having a DE 42 was fed into the feed tank, e.g., as shown in FIG. 1, and diluted to a dry substance content of about 43.5% by weight. The process was a single stage system with one nanofiltration membrane element having a 4 inch diameter. The fractionation process was conducted as a batch operation. The permeate was removed from the system, and the retentate was recycled back to the feed tank. Dilution water was periodically added into the feed tank to maintain material dry substance content below about 50% by weight. The retentate recycle was terminated when the DE value of the retentate reached about 15. The collected product had volume of 8 gallons and a dry substance content of about 52.55% by weight.

The process was operated at a pressure of about 485 psi and a temperature of about 50° C. The permeate flux was 8.43 GFD at the beginning and 1.66 GFD at the end of fractionating. The resultant maltodextrin has a DE of 14.9 and the following carbohydrate profile:

| Component | Weight % D.S. basis |
| --- | --- |
| Fructose | 0.021 |
| Dextrose | 0.616 |
| DP2 | 1.185 |
| DP3 | 3.649 |
| DP4 | 7.623 |
| DP5 | 10.302 |
| DP6 | 10.011 |
| DP7 | 6.839 |
| DP8 | 7.762 |
| DP9 | 6.679 |
| DP10 | 5.695 |
| DP11–21 | 31.900 |
| DP21+ | 7.719 |

The above maltodextrin was further evaporated using a lab rotary vacuum evaporator to 70% by weight dry solids content for storage stability tests. Two samples, one with no pH adjustment (about pH=4.5) and one with pH adjusted to 3.0 using 7% HCl, were prepared for storage tests. After 4 months storage at room temperature conditions, both samples were still as clear as the original and retrogradation free. There was no microbial growth either.

The polydispersity index of the resultant maltodextrin is 1.54. The viscosity of the maltodextrin of this example is 7116 cp at 70% dry solids by weight and at room temperature.

Example 4

Starting material for nanofiltration membrane fractionation in this example was a 23 DE enzyme-enzyme converted corn syrup made by, in a first step, liquifying corn starch to 14 DE using bacterial alpha amylase enzyme (Thermamyl T-120, obtained from Novo Nordisk) and, in a second step, saccharifying the resulting liquified material at a dry solids content of about 30% by weight and at a temperature of about 65° C. using bacterial alpha amylase (Thermamyl T-120 enzyme, Novo Nordisk). The conversion process was terminated when the DE value of the converted material reached about 23. The enzyme-enzyme converted corn starch hydrolysate was clarified using an ultrafiltration membrane to remove oil and protein.

The same processing system and nanofiltration membrane as in Example 1 was used to produce the maltodextrin of this example. Twenty gallons of 23 DE corn syrup at a dry solids content of about 30% by weight was fed into the feed tank, e.g. as shown in FIG. 1. The fractionation process was conducted as a batch operation. The permeate was taken out of the processing system, and retentate was recycled back to the feed tank. The DE value was monitored periodically. Dilution water was added periodically to maintain the dry solids content of the feed tank material at less than about 40% by weight. Retentate recycle was terminated when the DE value of the retentate reached about 17. The retentate was then sent forward. Following this, a carbon treatment and ion exchange refining process were conducted to de-color and de-ash the retentate. The retentate was then collected in a storage container as a product. The collected product had collected volume of 7 gallons, and a dry substance content of about 47% by weight.

The operating conditions included a pressure of about 500 psi and a temperature of about 45° C. The permeate flux was 12.4 GFD at the beginning and 4.6 GFD at the end of the fractionation. The resultant maltodextrin has a DE of 16.7 and the following carbohydrate profile:

| Component | Weight % D.S. basis |
|---|---|
| Fructose | 0.01 |
| Dextrose | 0.08 |
| DP2 | 1.71 |
| DP3 | 7.38 |
| DP4 | 4.33 |
| DP5 | 20.9 |
| DP6 | 20.58 |
| DP7 | 1.49 |
| DP8 | 1.49 |
| DP9 | 1.93 |
| DP10 | 2.2 |
| DP11–21 | 13.26 |
| DP21+ | 24.64 |

The collected maltodextrin product was further evaporated using a laboratory rotary vacuum evaporator to a dry solids content of 67% by weight. The maltodextrin product was stored at room temperature for 2.5 months and analyzed. The maltodextrin product remained clear and retrogradation free.

The polydispersity index of the resultant maltodextrin is 4.3. The viscosity of the resultant maltodextrin in accordance with the present invention is 8330 cp at 25° C. and at 70% by weight dry solids, which is lower than conventionally converted maltodextrin listed in Table 3 in example 7.

Example 5

Starting material for nanofiltration membrane fractionation in this example was a 36 DE acid converted corn syrup made by hydrolyzing corn starch at a dry substance content within the range of about 34–40% by weight using hydrochloric acid at pH 1.7 and at a temperature of about 128° C. The conversion process was terminated when the DE value of the converted material reached about DE 36. The acid converted corn starch material was clarified using a centrifuge to remove residual oil and protein. Following this, an ion exchange refining process was conducted to remove color and odor. Part of carbon treated material was ion exchange refined. The resultant material was a mixture of two streams which are ion exchange refined and non-ion exchange refined. This resultant material was evaporated to a dry substance content of about 80% by weight.

The same processing system and nanofiltration membrane, e.g., as shown in Example 1, were used to produce the low DE starch hydrolysate of this example. Thirty gallons of 36 DE corn syrup at a dry substance content of about 80% by weight was fed into the feed tank, e.g., as shown in FIG. 1, and diluted to a dry substance content of about 32.6% by weight. The fractionation process was conducted as a batch operation. The permeate was removed from the system, and retentate was recycled back to the feed tank. The DE value was monitored periodically. Retentate recycle was terminated when the DE value of the retentate reached about DE 18. The retentate was then sent forward and collected in a storage container as product. The collected product had a collected total volume of about 23 gallons and dry substance content of about 51.3% by weight. The operating conditions are the same as in Example 2.

The maltodextrin from nanofiltration membrane fractionation obtained by this example was evaporated to three different dry substance levels, or contents of about 65%, 70% and 75% by weight. A commercially available 55 high fructose corn syrup (HFCS) from Roquette America, Inc, at a dry substance content of about 77% by weight was diluted to produce three samples comprising a dry substance content of about 65%, 70% and 75% by weight, respectively. The resultant maltodextrins and 55 HFCS were blended in beakers by stirring and mixing in blending ratios of about 75:25 and about 50:50 of maltodextrin to 55 HFCS. About 70 ml of each sample was transferred into 4 ounce polypropylene specimen containers (made by Cole Parmer) for storage test and analysis.

The maltodextrin of this example is blended with a 55 HFCS corn syrup at different dry solid contents and different blending ratios. The improvement of the viscosity and water activity is shown in Tables 1 and 2. All samples were stored at room temperature (about 23° C.), without preservative addition and pH adjustment, for retrogradation and microbial stability tests.

The samples were stored for more than six months, and upon analysis none of the samples has been observed to exhibit hazing or microbial growth.

TABLE 1

Viscosity (cp) at 25° C. of blended maltodextrin

| Product | 65% DS | 70% DS | 75% DS |
|---|---|---|---|
| Maltodextrin (Example 2) | 1560 | 6930 | 79500 |
| 55 HFCS | 55 | 139 | 447 |
| Maltodextrin/55 HFCS at 75/25 weight blend | 499 | 1927 | 9000 |
| Maltodextrin/55 HFCS at 50/50 weight blend | 215 | 615 | 2600 |

TABLE 2

Water activity at 23° C. of maltodextrin-blend

| Product | 65% DS | 70% DS | 75% DS |
|---|---|---|---|
| Maltodextrin (Example 2) | 0.92 | 0.90 | 0.85 |
| 55 HFCS | 0.79 | 0.75 | 0.69 |
| Maltodextrin/55 HFCS at 75/25 weight blend | 0.89 | 0.85 | 0.78 |
| Maltodextrin/55 HFCS at 50/50 weight blend | 0.85 | 0.81 | 0.75 |

Example 6

Thirty gallons of acid converted 42 DE corn syrup were fed into a single stage nanofiltration membrane processing system, e.g., as shown in FIG. 1 (NIRO Hudson, Wis.), with a 4 inch spiral nanomembrane (ASP40 from Advanced Membrane Technology, CA). Thirteen gallons of clear liquid retentate having a DE of 13.5 were obtained. The process was performed at 500 psi and 45° C. The membrane used was made from a polysulfonated polysulfone with about 1000 Dalton molecular weight cut off. During the process, permeate flow was removed from the system and the retentate flow was recycled to the feed tank. The test continued until the retentate DE reached about DE 14. The dry solids content of resultant product was about 50% by weight and was further evaporated to a dry solids content of about 70% by weight using a lab scale rotary vacuum evaporator. The resulted product was analyzed using a Brookfield viscometer and HPLC. The viscosity of the analyzed product is only less than about half of the viscosity of conventionally produced material having a similar DE, and the carbohydrate profile was unique in that it had only 2.2% mono- and di-saccharides and 11.6% by weight oligosaccharides with D.P.>21. The analyzed product at 71% by weight dry substance was stored at room condition and remained clear for more than four (4) months.

Example 7

The advantage of the viscosity of the present invention over conventionally enzyme converted maltodextrins is shown in Table 3. In this example, samples produced in Examples 1, 2, and 3, and 4 are analyzed and compared with Glucidex 19, a conventional maltodextrin commercially available from ROQUETTE FRERES, and Maltrin® M180, a conventional maltodextrin commercially available from Grain Processing Co., as to viscosity.

Although not wishing to be bound by any particular theory, it is believed that the advantage of the viscosity of the present invention over conventional maltodextrins was due to narrow carbohydrate profile distribution.

Example 8

Related to Example 7, the carbohydrate profile of the present invention, exemplified in Examples 1, 2, 3, and 4 has less DP1 and DP2 as well as less DP21+, compared to the commercial maltodextrins having a similar DE, as shown in Table 4.

Again in this example, samples produced in Examples 1, 2, 3, and 4 are analyzed and compared with Glucidex 19 and Maltrin® M180, as in Example 7, to determine their respective carbohydrate profiles and polydispersity (Mw/Mn) as shown in Table 4.

TABLE 3

Viscosity (cp) at 25° C. of the maltodextrins

| Product | DE | 65% DS | 70% DS | 75% DS |
| --- | --- | --- | --- | --- |
| The present invention with 42 DE feed (example 1) | 14.5 | 1650 | 7450 | 65500 |
| The present invention with 36 DE feed (example 2) | 17.2 | 1560 | 6930 | 7950 |
| The present invention with 42 DE feed (example 3) | 14.9 | — | 7115 | — |
| The present invention with 23 DE feed (example 4) | 16.7 | — | 8330 | — |
| Conventional maltodextrin (Maltrin ® M180, commercially produced by Grain Processing Co.) | 19.4 | — | 21560 | — |
| Conventional maltodextrin (Glucidex 19, commercially produced by Roquette Freres) | 18.0 | 5240 | 18900 | 345000 |

TABLE 4

Carbohydrate Profile by HPLC and Polydispersity (Mw/Mn) by GPC

| | Present invention (example 1) | Present invention (example 2) | Present invention (example 3) | Present invention (example 4) | Glucidex 19 (Roquette Freres) | Maltrin ® M180 (Grain Processing Co.) |
| --- | --- | --- | --- | --- | --- | --- |
| DP1% | 0.808 | 2.120 | 0.64 | 0.09 | 1.81 | 2.21 |
| DP2% | 1.517 | 3.038 | 1.18 | 1.71 | 5.95 | 7.02 |
| DP3% | 3.557 | 5.803 | 3.65 | 7.38 | 8.27 | 9.20 |
| DP4% | 6.627 | 6.884 | 7.62 | 4.33 | 6.78 | 7.57 |
| DP5% | 8.359 | 9.032 | 10.30 | 20.9 | 7.14 | 7.25 |
| DP6% | 8.442 | 10.626 | 10.00 | 20.58 | 7.74 | 11.66 |
| DP7% | 7.960 | 7.789 | 6.80 | 1.49 | 5.80 | 8.49 |

TABLE 4-continued

Carbohydrate Profile by HPLC and Polydispersity (Mw/Mn) by GPC

|  | Present invention (example 1) | Present invention (example 2) | Present invention (example 3) | Present invention (example 4) | Glucidex 19 (Roquette Freres) | Maltrin ® M180 (Grain Processing Co.) |
|---|---|---|---|---|---|---|
| DP8–21% | 52.195 | 45.343 | 52.00 | 18.88 | 23.08 | 17.50 |
| DP21+ | 10.534 | 9.434 | 7.70 | 24.64 | 33.44 | 29.10 |
| Mw/Mn | 1.59 | 2.45 | 1.54 | 4.3 | 7.07 | 5.65 |

Example 9

Three oil-in-water emulsions comprising orange oil flavoring, lecithin, and low DE starch hydrolysate representative of either: (1) a conventional low DE starch hydrolysate (DRI-SWEET® manufactured by Roquette America, Keokuk, Iowa) having a DE of about 18, or (2) a non-hydrogenated low DE starch hydrolysate of the present invention having a DE of about 18 (LDESH), or (3) a hydrogenated form of low DE starch hydrolysate of the present invention having a DE of about 18 (HLDESH), were prepared and evaluated for stability. The preparation of the emulsion was conducted at a temperature of about 22° C. to about 30° C.

In a first step of preparing the emulsions, 3 g. of lecithin (emulsifier) was mixed with 97 g. of the respective low DE starch hydrolysate product having a dry solids content of about 45% by weight in an ultraspeed homogenizer at 20,000 rpm for 3 minutes. In a second step, while continuing to mix at 20,000 rpm, 5 g. of orange oil flavoring was added dropwise to the mixture during 5 minutes. Following completion of the addition, mixing was continued for another 2 minutes. The resultant emulsions were determined to comprise, in weight percent: 4.8% orange oil flavoring, 2.8% lecithin, 50.8% water, and 41.6% dry solids basis of DRI-SWEET® or LDESH or HLDESH.

20 mL samples of each resulting emulsion were transferred to individual vials of the type used for chromatographic head-space analysis, and capped and sealed with a silicone-teflon septum. Samples of each of the three emulsion compositions were then stored in said vials under three different temperature conditions, i.e. about 22° C., 50° C., and 60° C.

Samples of the three emulsion compositions were stored under each of the three temperature conditions and evaluated for stability. Results of the periodic evaluation are presented in Table 5.

TABLE 5

Emulsions Comprising Orange Oil Flavoring, Lecithin, and DRI-SWEET ® or LDESH or HLDESH

| Parameter | DRI-SWEET ® | | | LDESH | | | HLDESH | | |
|---|---|---|---|---|---|---|---|---|---|
| Storage Temperature (° C.) | 22 | 50 | 60 | 22 | 50 | 60 | 22 | 50 | 60 |
| Emulsion Stability after 2 days storage | S | S | S | VS | VS | VS | VS | VS | VS |
| Emulsion Stability after 5 days storage | NS | NS | NS | S | S | S | S | S | S |
| Emulsion Stability after 15 days storage | NS | NS | NS | S | S | S | S | S | S |
| Time to observable phase separation (days) | 15 | 5 | 2 | >30 | >30 | >30 | >30 | >30 | >30 |
| Time to observable creaming effect[2] (days) | 15 | 5 | 2 | >30 | >30 | >30 | >30 | >30 | >30 |
| Time to observable by product[3] (days) | 15 | 5 | 2 | >30 | >30 | >30 | >30 | >30 | >30 |

[1]VS = Very Stable; S = Stable; *NS = Unstable
[2]i.e. appearance of a cream-like layer on the surface of the emulsion
[3]i.e. a colored by product observed to form on top of the emulsion Example 10

Three encapsulated compositions comprising orange oil flavoring, lecithin, and low DE starch hydrolysate representative of: (1) a conventional low DE starch hydrolysate (DRI-SWEET®, manufactured by Roquette America, Keokuk, Iowa) having a DE of about 18, or (2) a non-hydrogenated low DE starch hydrolysate of the present invention having a DE of about 18 (LDESH), or (3) a hydrogenated form of low DE starch hydrolysate of the present invention having a DE of about 18 (HLDESH), were prepared and evaluated in this example.

In a first step, a composition comprising an emulsion was prepared by mixing 6 g. of lecithin with 594 g. of the respective low DE starch hydrolysate product having a dry solids content of about 45% by weight in an ultraspeed homogenizer at 20,000 rpm for 3 minutes. While continuing to mix, 30 g. of orange oil flavoring was added dropwise to the mixture during 5 minutes. Following completion of the addition, mixing was continued for another 2 minutes. The resulting emulsion was determined to comprise, in weight percent, 4.8% orange oil flavoring, 0.95% lecithin, 51.8% water, and 42.4% dry solids basis of DRI-SWEET® or LDESH or HLDESH.

In a second step, the resultant emulsion was fed to the heated feed nozzle of a spray dryer, e.g. Büchi, CH, via a peristaltic pump. Hot compressed air provided the atomization of the feed and dried the droplets in the dryer. Operating conditions of the spray-dryer are summarized in Table 6.

TABLE 6

Spray-dryer Operating Conditions

| OPERATING PARAMETER | OPERATING CONDITION |
|---|---|
| Inlet temperature | 170° C. |
| Outlet temperature | 112–116° C. |
| Pump | 5–6 mL/min |
| Aspiration | 100% |
| Vacuum | −32 mbar |
| Air flow rate | 650 L/h |

The fate of the flavor oil was determined by gas chromatography analysis and verified by mass balance.

The resulting spray-dried flavor encapsulates prepared using non-hydrogenated and hydrogenated forms of low DE starch hydrolysate of the present invention (LDESH and HLDESH, respectively) are powders comprised of generally non-crystalline, spherical particles of amorphous material having a continuous glassy film morphology. Results obtained on examination of various properties of the resultant spray dried flavor encapsulate are summarized in Table 7.

TABLE 7

Encapsulates Comprising Orange Oil Flavoring and DRI-SWEET® or LDESH, or HLDESH

| PROPERTY | DRI-SWEET® | LDESH | HLDESH |
|---|---|---|---|
| Total Oil % | 3.5 | 7.75 | 7.40 |
| Surface Oil % | 0.046 | 0.040 | 0.020 |
| Retention Oil % | 34 | 76 | 71 |
| Moisture % | 3.34 | 3.63 | 2.56 |
| Glass Transition Temperature, $T_g$ | 8–11° C. | 9–13° C. | 14–22° C. |
| Water Activity | 0.168 | 0.177 | 0.157 |
| Particulate Mean Diameter (μm) | 9.01 | 10.81 | 13.27 |
| Colored byproduct formed? | Yes - Brown | Yes - Brown | No |
| Solubility in cold water | Instant | Instant | Instant |

The resulting spray-dried flavor encapsulates comprising LDESH and HLDESH were found to possess the following properties: spherical shape, powdery and amorphous material of continuous glassy film morphology with a mean size diameter of about 10 to about 13 μm; crystallineless structure with a glass transition temperature above about 8° C.; high flavor oil retention, which exceed 70%; low surface oil content, which was below 0.05%; moisture content of about 3%; low water activity of about 0.157 to about 0.177; high oil stability and slow rate of oxydation, as measured by formation of limonene oxyde, relative to encapsulates with the same oil concentration and comprised of conventional starch hydrolysate.

Although only an exemplary embodiment of the invention has been described in detail above, those skilled in the art will readily appreciate that many modifications are possible without materially departing from the novel teachings and advantages of this invention. Accordingly, all such modifications are intended to be included within the scope of this invention as defined in the following claims.

In the claims, means-plus-function clauses are intended to cover the structures described herein as performing the recited function and not only structural equivalents but also equivalent structures.

What is claimed is:

1. A process for producing a low DE starch hydrolysate, said process comprising fractionating a starch hydrolysate having a DE greater than about 18 using a nanofiltration membrane selected from the group consisting of teflon membranes, stainless steel membranes, ceramic membranes, and polymeric membranes having a molecular weight cut-off of less than 4,000 daltons under nanofiltration conditions effective to result in a low DE starch hydrolysate having a DE of less than about 25.

2. The process of claim 1, wherein said nanofiltration membrane is selected from the group consisting of polyamide membranes and polysulfonated polysulfone membranes having a molecular weight cut-off within a range of about 400 daltons to about 4,000 daltons.

3. The process of claim 2, wherein said molecular weight cut-off is within a range of about 800 daltons to about 2,500 daltons.

4. The process of claim 1, wherein said nanofiltration conditions comprise a pressure of less than about 600 psi.

5. The process of claim 1, wherein said nanofiltration conditions comprise a temperature of less than about 95° C.

6. The process of claim 1, wherein said starch hydrolysate comprises at least one member selected from the group consisting of acid converted starch hydrolysate, enzyme converted starch hydrolysate, acid-enzyme converted starch hydrolysate, and enzyme-enzyme converted starch hydrolysate.

7. The process of claim 1, wherein said starch hydrolysate having a DE greater than about 18 comprises at least one member selected from the group consisting of non-hydrogenated starch hydrolysate, hydrogenated starch hydrolysate, oxidized starch hydrolysate, and other derivatized starch hydrolysate.

8. The process of claim 1, wherein said low DE starch hydrolysate comprises a liquid, substantially non-retrograding, low DE starch hydrolysate having a DE of less than about 25.

9. A substantially non-retrograding low DE starch hydrolysate produced by the process of claim 8.

10. The process of claim 1, comprising drying said low DE starch hydrolysate to a moisture content of less than about 10% to result in a substantially dry, low DE starch hydrolysate.

11. The process of claim 10, wherein said drying comprises a member selected from the group consisting of spray-drying and extrusion.

12. A substantially dry low DE starch hydrolysate produced by the process of claim 10.

13. The process of claim 1, comprising hydrogenating said low DE starch hydrolysate to result in a hydrogenated low DE starch hydrolysate.

14. The process of claim 13, comprising drying said hydrogenated low DE starch hydrolysate to a moisture content of less than about 10% to result in a substantially dry, hydrogenated low DE starch hydrolysate.

15. A substantially dry, hydrogenated low DE starch hydrolysate produced by the process of claim 14.

16. A hydrogenated low DE starch hydrolysate produced by the process of claim 13.

17. A low DE starch hydrolysate produced by the process of claim 1.

18. A low DE starch hydrolysate product comprising a low DE starch hydrolysate having a DE less than about 25 and having a polydispersity index of less than about 5.

19. The product of claim 18, wherein said product exhibits a viscosity at 70% dry solids content and at 25° C. of less than about 30,000 centipoise.

20. The product of claim 19, wherein said viscosity is less than about 25,000 centipoise.

21. The product of claim 18, wherein said DE is within a range of about 8 to about 20.

22. The product of claim 18, wherein said low DE starch hydrolysate comprises a substantially non-retrograding low DE starch hydrolysate.

23. The product of claim 18, wherein said low DE starch hydrolysate comprises a liquid, low DE starch hydrolysate.

24. The product of claim 23, wherein said low DE starch hydrolysate comprises a dry solids content within a range of about 50% to about 85% by weight.

25. The product of claim 18, wherein said low DE starch hydrolysate product is substantially dry.

26. The product of claim 18, wherein said low DE starch hydrolysate is hydrogenated.

27. The product of claim 18, wherein said low DE starch hydrolysate product is substantially dry and hydrogenated.

28. A process for producing a low DE starch hydrolysate-blend, said process comprising combining the product of claim 18 with at least one other substance in a predetermined blending ratio to result in a low DE starch hydrolysate-blend.

29. The process of claim 28, wherein said product is substantially non-retrograding.

30. A product produced by the process of 29.

31. The process of claim 28, wherein said product is substantially dry.

32. A product produced by the process of claim 31.

33. The process of claim 28, wherein said product is hydrogenated.

34. A product produced by the process of claim 33.

35. The process of claim 28, wherein said product is substantially dry and hydrogenated.

36. A product produced by the process of claim 35.

37. The process of claim 28, comprising hydrogenating said low DE starch hydrolysate-blend.

38. A product produced by the process of claim 37.

39. The process of claim 28, wherein said ingredient is selected from the group consisting of sugar alcohols, propylene glycol, glycerine, insulin, and saccharides.

40. A product produced by the process of claim 28.

41. A product comprising the low DE starch hydrolysate of claim 18, and at least one member selected from the group consisting of beverage ingredients, food ingredients, animal feed ingredients, pharmaceutical ingredients, nutraceutical ingredients, cosmetic ingredients, and industrial ingredients.

42. A process for producing a substantially thermal and shelf-life stable emulsion comprising forming a mixture of the low DE starch hydrolysate of claim 18 with an effective concentration of at least one ingredient to result in an emulsion.

43. The process of claim 42, wherein said effective concentration of ingredient is within a range of about 0.1% to about 50% by weight.

44. The process of claim 42, wherein said low DE starch hydrolysate comprises a dry solids content within a range of about 1% to about 75% by weight.

45. The process of claim 42, wherein said emulsion further comprises an emulsifying amount of an emulsifier.

46. The process of claim 42, wherein said low DE starch hydrolysate is hydrogenated.

47. A emulsion produced by the process of claim 46.

48. An emulsion produced by the process of claim 42.

49. A substantially thermal and shelf-life stable emulsion comprising the low DE starch hydrolysate of claim 18 as an aqueous matrix and at least one other ingredient.

50. The emulsion of claim 49, wherein the content of said ingredient is less than about 65% by weight.

51. The emulsion of claim 49, wherein said low DE starch hydrolysate is hydrogenated.

52. The emulsion of claim 49, wherein said emulsion is an oil in water emulsion comprising said ingredient as an internal oil phase and said low DE starch hydrolysate as an external aqueous matrix.

53. The emulsion of claim 49, wherein said emulsion is a member selected from the group consisting of oil in water and water in oil emulsions, and said emulsion comprises an emulsifier in said aqueous matrix.

54. A process for producing a substantially dry ingredient encapsulate comprising the steps of:

(1) forming an aqueous matrix composition comprising the low DE starch hydrolysate of claim 18;

(2) mixing at least one ingredient with said matrix composition to form a mixture; and (3) drying said mixture to result in a substantially dry ingredient encapsulate.

55. The process of claim 54, wherein said low DE starch hydrolysate comprises a dry solids content within a range of about 25% to about 55% by weight.

56. The process of claim 54, wherein the content of said ingredient is within a range of about 0.1% to about 75% by weight.

57. The process of claim 54, wherein said mixture comprises an emulsion.

58. The process of claim 54, wherein said drying comprises a member selected from the group consisting of spray drying and extrusion.

59. The process of claim 54, wherein said low DE starch hydrolysate is hydrogenated.

60. A hydrogenated dry ingredient encapsulate produced by the process of claim 59.

61. A dry ingredient encapsulate produced by the process of claim 54.

62. A substantially dry ingredient encapsulate comprising at least one ingredient entrapped in an amorphous matrix of the product of claim 18.

* * * * *